United States Patent

Pultz

[11] 3,804,382
[45] Apr. 16, 1974

[54] EXTRUDER CONSTRUCTION
[75] Inventor: Wallace W. Pultz, Cincinnati, Ohio
[73] Assignee: Cincinnati Milacron Inc., Cincinnati, Ohio
[22] Filed: July 1, 1971
[21] Appl. No.: 158,724

[52] U.S. Cl. .............................................. 259/192
[51] Int. Cl. .............................................. B01f 7/08
[58] Field of Search ................... 259/191, 192, 104, 259/6, 21, 40, 41, 193; 425/461

[56] References Cited
UNITED STATES PATENTS

| | | | |
|---|---|---|---|
| 2,961,701 | 11/1960 | Hannold | 259/192 |
| 3,277,529 | 10/1966 | Linder | 425/461 |
| 3,375,549 | 4/1968 | Geyer | 259/192 |
| 3,407,438 | 10/1968 | Selbach | 259/192 |

Primary Examiner—Robert W. Jenkins

[57] ABSTRACT

A twin screw extruder having a segmented barrel which includes a plurality of wear inserts positioned in the wall of the barrel at points of maximum wear. The inserts are flush with the inner surface of the barrel and are longitudinally positioned in at least one of the barrel segments at the points at which localized high wear would normally occur. The materials employed are preferably highly wear resistant metals having a high surface microhardness and the inserts can be replaced when necessary to thereby prolong the effective life of the barrel.

9 Claims, 3 Drawing Figures

PATENTED APR 16 1974  3,804,382

INVENTOR.
WALLACE W. PULTZ

BY
ATTORNEYS

EXTRUDER CONSTRUCTION

BACKGROUND OF THE INVENTION

This invention relates to plastics extruders and more particularly to an improved barrel construction for such extruders wherein highly wear resistant and high hardness wear inserts are strategically positioned within the barrel to extend the effective operating life of the barrel.

Plastics extruders generally comprise a cylindrical barrel within which a plasticating screw is rotatably positioned. The plastic to be processed is introduced near one end of the extruder and is carried therethrough by the screw, which heats and softens the material by physically working it. The heating imparted to the plastic by the mechanical working can be supplemented by externally applied heat as provided, for example, by circumferential band heaters applied to the outer surface of the barrel. The material which issues from the opposite end of the extruder is generally of a fluid or molten state of relatively high viscosity, yet suitable for forming into the particular shapes desired.

Barrels of such extruders usually have their inner surfaces treated in such a manner as to provide a hard surface to thereby minimize wear caused when the screw is rotated therewithin. The requisite hardness and wear resistance are imparted either by nitriding the inner surface of the barrel or by centrifugally spraying, casting or otherwise applying a wear resistant, hard lining material to the entire inner surface of the barrel. An example of such a material is the hard, wear resistant ferrous alloy disclosed and claimed in U.S. Pat. No. 3,334,996, granted Aug. 8, 1967, to G. Foster et al. Barrels incorporating such a lining material, an example of which is commercially known by the registered trademark Xaloy, are preferred over nitrided barrels since the wear characteristics of the Xaloy material is significantly better than that attainable by the nitriding process.

The foregoing discussion relating to barrel lining materials applies principally to cylindrical barrels which house only a single rotating screw. In twin screw extruders, however, where two intermeshing screws are provided, a cross section through the barrel reveals that the inner surface thereof defines a figure 8 which is composed of two loops which are open at their intersection. Although the inner surfaces of barrels for twin screw extruders can be and are nitrided, it is very difficult to obtain a uniform thickness coating of, say, a liner material such as Xaloy because of the cusps which are present where the circular portions of the barrel intersect. As a result, it has been proposed that barrels for twin screw extruders be essentially formed from two single barrels, each of which has had a minor longitudinal portion thereof removed, and the remaining barrel portions joined to one another by means of welding. Such an approach is disclosed in U. S. Pat. No. 3,277,529, granted Oct. 11, 1966, to D. W. Linder.

It has been found, however, that even the welding approach is not desirable because the heat from the welding operation causes distortion in the barrel portions which are joined, which distortion sometimes render the barrels useless. This problem is particularly troublesome in connection with conical twin-screw extruders where the cross-section of the inner surface of the barrel is not constant along the axis of the barrel but varies from one end thereof to the other.

It has further been found that the nitrided barrels of twin-screw extruders sometimes exhibit localized areas of high wear which are caused by the screws being forced outwardly, or bowed, against the barrel inner surface by the plasticated material as it is transformed from the solid particulate stage to a highly viscous mass. The resultant bowing causes the screws to rub against localized portions of the inner surface of the barrel and thereby results in increased localized wear. This particular problem is aggravated when corrosive materials such as polyvinyl chloride are processed in such a twin screw extruder.

It is an object of the present invention to overcome the above-described difficulties.

SUMMARY OF THE INVENTION

Briefly stated, in accordance with one aspect of the present invention, an extruder is provided having a hollow barrel which includes a material outlet at one end thereof, a material inlet spaced from the outlet end, and a pair of screws which are rotatably positioned within the barrel. The barrel has an internal surface which in cross-section is defined by a pair of intersecting circular arcs. A plurality of substantially wear resistant elements are positioned to define a portion of the internal surface of the barrel and are oriented so that the longest dimension thereof is disposed generally axially with respect to the extruder. The wear resistant elements are preferably metallic and have a high surface microhardness and high wear resistance.

DESCRIPTION OF THE PREFERRED EMBODIMENTS

Figure 1:
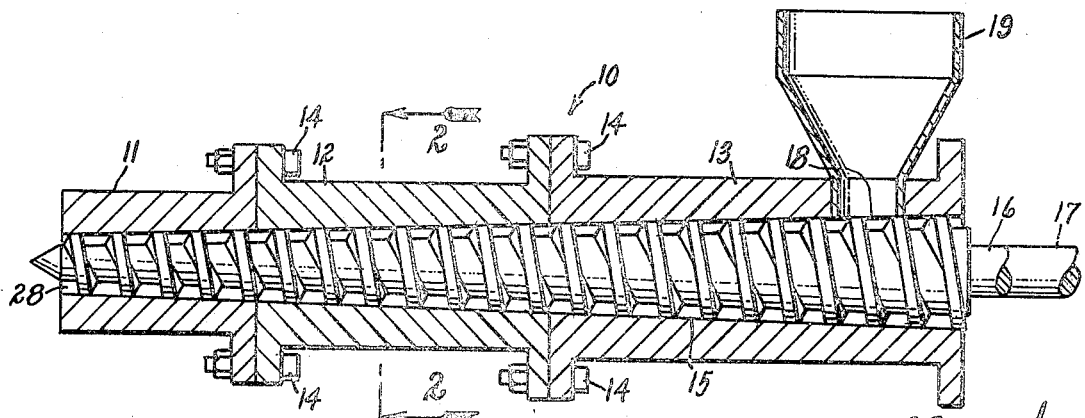
FIG. 1 is a longitudinal cross-sectional view of a conical, twin-screw extruder showing the position of the screws within the barrel.

Referring now to the drawings and particularly to FIG. 1 thereof, there is shown the barrel 10 of an extruder. Barrel 10 comprises a forward section 11, a middle section 12, and rearward section 13 which are serially connected, as for example by means of bolts 14, to provide a continuous internal bore 15. Rotatably disposed within bore 15 is a pair of conical screws 16, 17. Screws 16, 17 are driven by a suitable motor (not shown) through drive means well-known to those skilled in the art. Barrel 10 includes an inlet opening 18 which can be in communication with a suitable material storage device such as a hopper 19. After the material has passed through the extruder, it issues from the outlet 20 thereof in highly viscous form suitable for shaping into any desired shape. Although the extruder shown in FIG. 1 is a conical twin-screw extruder, the present invention is also applicable to a parallel twin-screw extruder where the axes of the twin screws are parallel and do not intersect as they do in the case of a conical twin-screw extruder.

Figure 2:
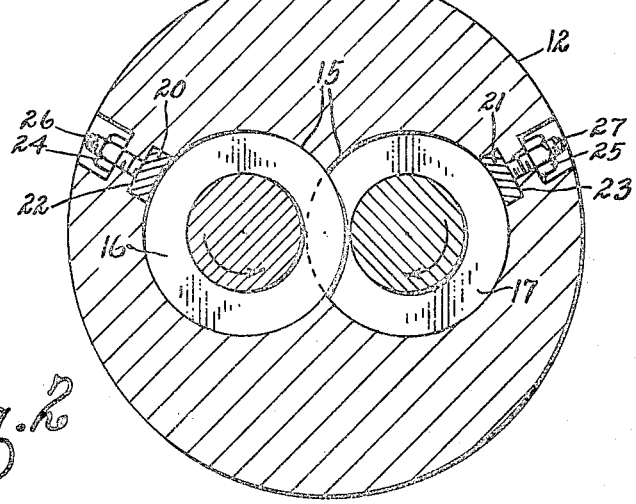
FIG. 2 is a transverse cross-sectional view taken along the line 2—2 of FIG. 1 and showing one form of wear insert and its method of attachment to the barrel.

The portion of the extruder shown in FIG. 1 is shown in a transverse cross-section in FIG. 2, which illustrates the position of the twin screws 16, 17 within barrel 10 and shows them intermeshing relationship. Positioned within barrel 10 and flush with internal bore 15 thereof are wear inserts 20, 21, which are strategically positioned in the areas of maximum wear. Inserts 20, 21 are of generally rectangular cross-section and one of their longitudinal surfaces conforms with the curvature of bore 15 in which they are positioned at what can be considered the 10 o'clock and 2 o'clock positions in the internal bores 15 of barrel 10, because those are the areas against which the maximum side thrust of the screws is applied when the material passes between the screws and they rotate in the direction shown by the arrows in FIG. 2. Internal bores 15 can be formed by means of the boring apparatus shown and described in U. S. Pat. No. 3,404,588, which issued Oct. 8, 1968, to A. Anger.

In operation, material is supplied to hopper 19 and passes through material inlet 18 and against the rotating screws 16, 17, which carry the material upwardly, outwardly and around the periphery of the central portion thereof and then progressively transport the material through the length of the extruder barrel. In the course of being so transported, the material is heated by being mechanically worked to a degree by the two contrarotating screws, and can also be heated by means of external heating means (not shown) of a type which is well-known to those skilled in the art. The material as it is first introduced into the extruder is a solid in the form either of coarse granules or a fine powder. As the material is heated and worked, it tends to soften and as it reaches approximately the middle section 12 of barrel 10 is begins to soften and becomes an amorphous, highly viscous mass. Upon subsequent heating, its viscosity decreases up to the point where it issues from the outlet 28 of the extruder in a substantially fluid state for subsequent processing such as, for example, by extrusion through a suitable forming die (not shown). As the material reaches the amorphous state, where it is transformed from a solid to a highly viscous liquid, as it is transported around the screw and back again to the nip formed by the two contrarotating screws, it has a tendency to force the screws apart and urges them against the walls of the barrel in approximately the 10 o'clock and 2 o'clock positions as shown in the cross-section of FIG. 2. If the screws were each rotating in the opposite directions from those shown in FIG. 2 the wear would take place at the 8 o'clock and 4 o'clock positions, respectively, and the wear inserts would be positioned accordingly.

Since it has been found that the point where the high wear commences is approximately the mid-point of the extruder between inlet 18 and outlet 28 thereof, wear inserts 20, 21, of the present invention need only be applied to middle section 12 of the extruder. It would be possible to provide larger wear inserts and to position them so that they extend the entire length of the barrel, if desired, but it is not necessary to do so and, in fact, may well be an unwarranted added expense. Although the area of maximum wear has heretofore been referred to generally as the middle section of an extruder, it would be apparent to those skilled in the art that the precise point of maximum wear or the point at which the plastics material is transformed from a solid to highly viscous liquid is variable, and depends upon several factors such as, for example, the screw diameter and speed, the pitch of the flights on the screw, the nature of the material, the temperature of the barrel, etc.

Figure 3:
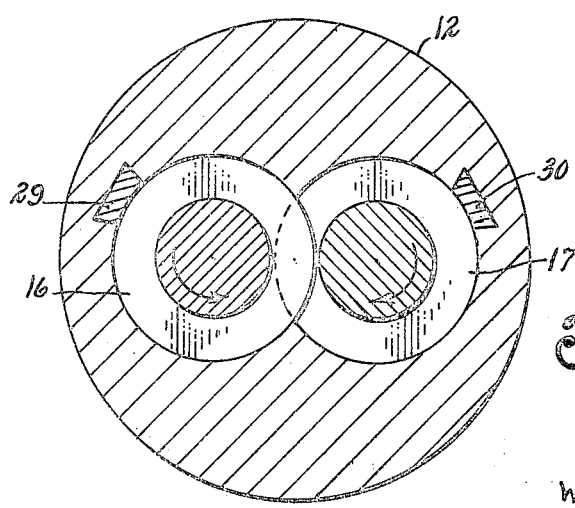
FIG. 3 is a transverse cross-sectional view similar to that of FIG. 2 and shows an alternative method of positioning the wear inserts on the inner surface of the barrel.

An alternate method of insertion and retention of the wear inserts of the present invention is shown in the cross-sectional view of FIG. 3. In that view, inserts 29, 30, are of a generally trapezoidal cross-section and are received in dovetail-like slots formed on the bore surfaces 15 of barrel 10.

Preferably, the wear inserts of the present invention are formed from materials characterized by high wear resistance and high surface hardness. An example of a suitable material from which to form the inserts of the present invention is a hard, wear resistant, ferrous alloy commercially known as "Xaloy," the composition of which is disclosed in U. S. No. 3,334,996, granted Aug. 8, 1967, to G. Foster et al., the disclosure of which is hereby incorporated by reference herein. The alloys disclosed in that patent are characterized by very high hardness and excellent wear resistance characteristics and have a surface hardness on the Rockwell C scale ranging from about 60 to about 70.

Other suitable materials for the wear inserts of the present invention are steels having so-called metallided surfaces prepared according to the process disclosed in U. S. Pat. No. 3,024,176, granted March 6, 1962. to Newell C. Cook. The specific metalliding process which is especially preferred for the wear inserts of the present invention is referred to as "boriding" and steels so treated are referred to as "borided steels." Borided steels have a boride coating and are superior to nitrided steels and also superior to Xaloy when considered from the standpoint of resistance to wear under heavy loads. The preferred borided materials have a high surface microhardness ranging from about 1,500 Kg/mm$^2$. Most preferably, the materials utilized in this invention have a surface microhardness in the range of at least about 1,900 Kg/mm$^2$.

Table I below shows the wear and hardness characteristics of a number of the preferred wear insert materials. Also tabulated are several of the materials which, by virtue of similar surface treatment, have hardness characteristics similar to materials employed in extruder barrels now in commercial use.

The weight change, wear depth, and wear length data present Table I were obtained by testing the samples on a Timken Roller Bearing Co. Alpha tester, Manufactured by the Timken Roller Bearing Co., Canton, Ohio, and which was initially developed for the testing of lubricants. This device is described on pages 1 – 265 to 1 – 267 of The Timken Engineering Journal, published in 1950 by The Timken Roller Bearing Co. In obtaining the wear data presented in Table I, the test materials were provided in the form of a rectangular block approximately 15 mm. × 10 mm. × 6 mm. The rotating ring, the edge of which bears against the test specimen, is made of carburized steel having a hardness of 60 on the Rockwell C scale, is a disc shaped member having an outer diameter of 35 mm. and a thickness of 9 mm. The wear tests were performed by rotating the ring of "Timken cup" as it is sometimes called, in air, at a surface speed of 356 surface fpm. at the outermost surface of the disc and without any lubricant. The load applied to urge the test block against the rotating ring was an initial load of 30 lb. which was increased by an additional 30 lb. after 1½, 3, and 4½ minutes had elapsed. The total time each test specimen was subjected to wear was 5 minutes. The microhardness values tabulated in Table I are the average values of 10 indentations over a typical area, utilizing a Bergman diamond pyramid indentor under a 25 gram load. The wear index tabulated in Table I is the ratio of the weight change due to wear of a given sample to the weight change due to wear of an equally sized Xaloy sample having a surface hardness of 64 on the Rockwell C scale (microhardness of 820 Kg/mm$^2$) which has been subjected to identical wear tests.

Although the high hardness, high wear resistance materials are especially preferred, the fact that the inserts of the present invention are replaceable means that even nitrided steel inserts are suitable. While the effective operating life of nitrided steel inserts may not be as long as that for, say, Xaloy inserts, that the former are replaceable does operate to extend the useful operating life of barrels so equipped.

TABLE I

| Sample Type (caisisae) | Surface Treatment | Weight change (mg.) | Wear Index | Wear depth (mils) | Wear length (in.) | Microhardness (Kg/mm$^2$) |
|---|---|---|---|---|---|---|
| 8617 | borided | −0.2 | 0.07 | 0.40 | 0.069 | 2170 |
| 8650 | " | −0.5 | 0.18 | 0.48 | 0.069 | 2090 |
| 1117 | " | −0.8 | 0.29 | 1.06 | 0.084 | 1860 |
| 1018 | " | −0.9 | 0.32 | 0.92 | 0.062 | 2040 |
| 1020 | " | −0.5 | 0.18 | 0.98 | 0.071 | 2070 |
| 4150 | " | −0.2 | 0.07 | 0.68 | 0.064 | 1920 |
| 4140 | Borided | −0.1 | 0.04 | 0.35 | 0.068 | 1920 |
| Xaloy (R$_c$64) | | −2.8 | 1.0 | 2.14 | 0.104 | 820 |
| 4620 (R$_c$60) | Case Hardened | −97.0 | 34.7 | >20 | ≈0.3 | 700 |
| 4150 | Nitrided | −89.6 | 32.0 | >20 | ≈0.3 | 750 max. |
| 135 Nitralloy | " | −119 | 42.5 | >20 | ≈0.3 | |

While particular embodiments of the invention have been illustrated and described, it will be apparent to those skilled in the art that various changes and modifications can be made without departing from the spirit and scope of the invention, and it is intended to cover in the appended claims all such changes and modifications that are within the scope of this invention.

What is claimed is:

1. In a plastic extruder comprising a hollow barrel having a material outlet at one end of said barrel, a material inlet spaced from said one end of said barrel, a pair of screws rotatably positioned within said barrel, and means to rotate said screws, the improvement comprising:
   a. said hollow barrel comprising a plurality of sections interconnectable in series to define a barrel with a continuous internal surface in the axial direction, said internal surface defined in cross section by a pair of intersecting circular arcs; and
   b. a plurality of substantially wear resistant elements positioned to define a portion of the internal surface of at least one of said barrel sections, said wear resistant elements having the longest dimension thereof disposed generally axially of the circular arc on the surface in which they lie and having their innermost surfaces flush with the inner surfaces of the barrel to form a continuous barrel inner surface in the axial direction.

2. The extruder of claim 1 wherein said wear resistant elements have a surface microhardness of at least about 700 Kg/mm$^2$ and a wear index of at least about 35.

3. The extruder of claim 1 wherein said wear resistant elements have a surface microhardness greater than about 700 Kg/mm$^2$ and a wear index of at least about 1.

4. The extruder of claim 1 wherein said wear resistant elements have a surface microhardness greater than about 1,500 Kg/mm$^2$ and a wear index less than 1.

5. The extruder of claim 1 wherein said wear elements are removable from the barrel thereof.

6. The extruder of claim 5 wherein said wear elements have a generally trapezoidal cross-section and are received in dovetail-like slots formed in said barrel.

7. The extruder of claim 5 wherein said wear inserts include studs which project from the rearmost surfaces thereof and to which bolts may be attached from the outside of said extruder to secure said inserts to said extruder barrel.

8. The extruder of claim 7 wherein said wear inserts are radially inwardly adjustable in said barrel as wear progresses to maintain the innermost surfaces thereof substantially flush with the inner surface of the barrel.

9. The extruder of claim 1 wherein said barrel is divided into three sections of substantially equal, axial lengths wherein said wear inserts are positioned in the middle section of said barrel.

* * * * *